Sept. 6, 1949.  J. H. SCHREIBER  2,481,161
JOINT BREAKER AND CATHEAD
Filed April 22, 1944  2 Sheets-Sheet 1
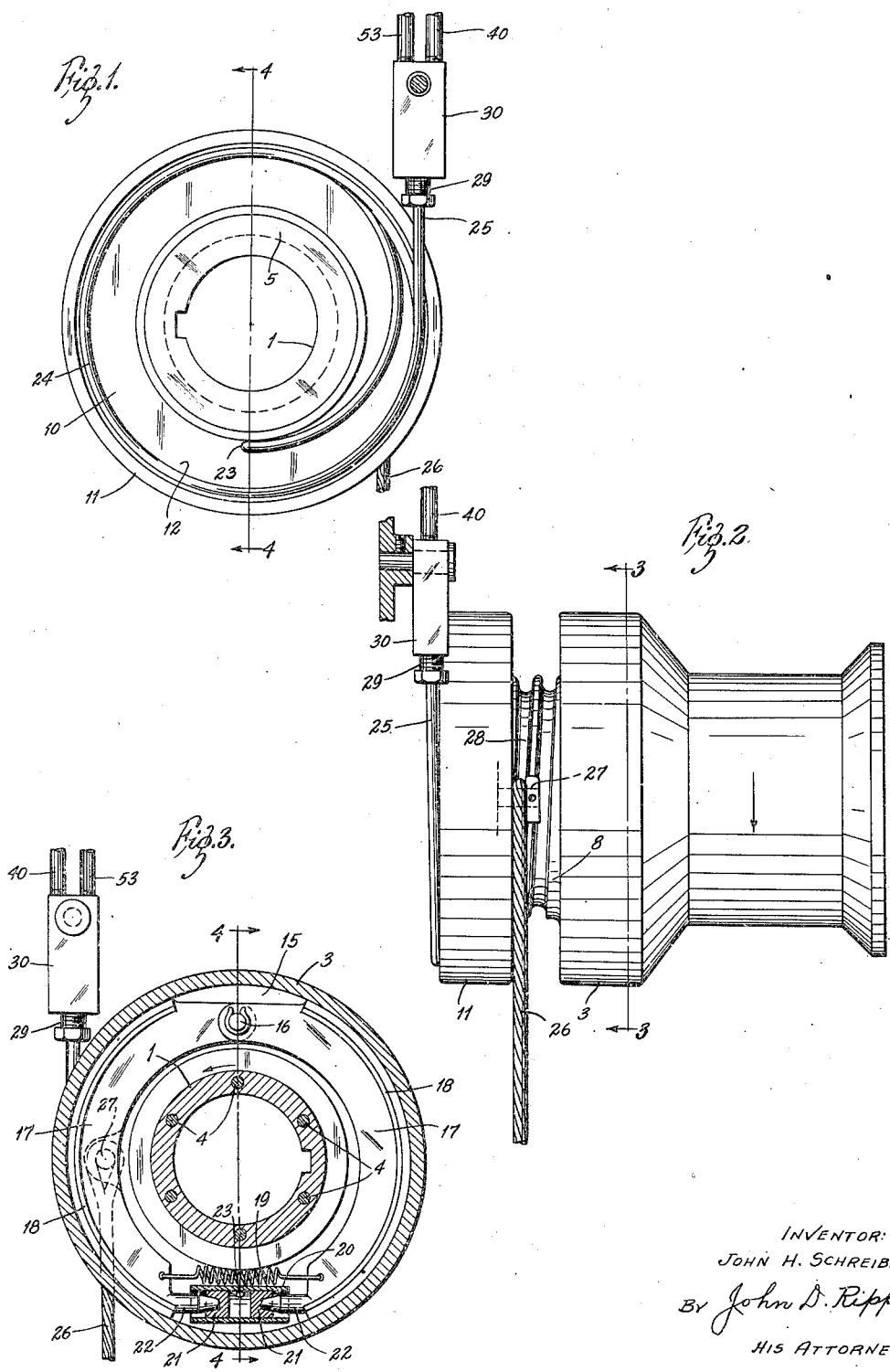
INVENTOR:
JOHN H. SCHREIBER,
By John D. Rippey
HIS ATTORNEY.

Sept. 6, 1949.  J. H. SCHREIBER  2,481,161
JOINT BREAKER AND CATHEAD
Filed April 22, 1944  2 Sheets-Sheet 2
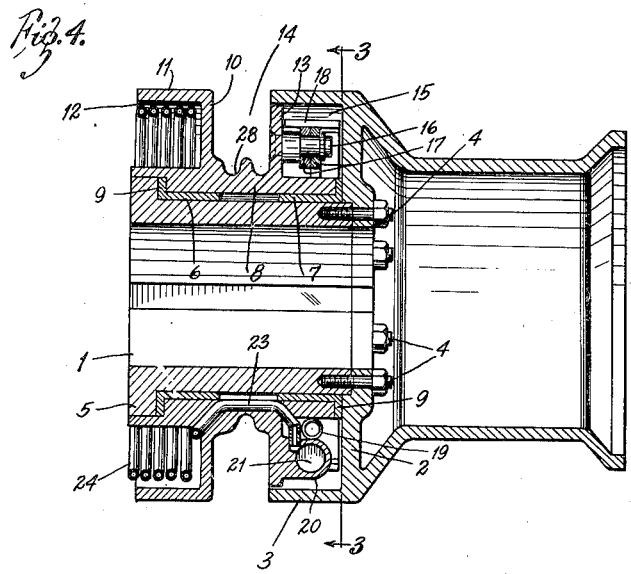
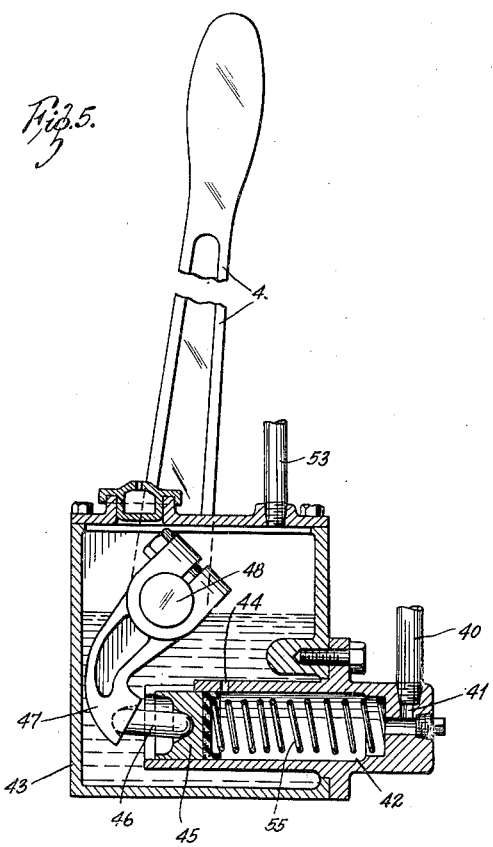
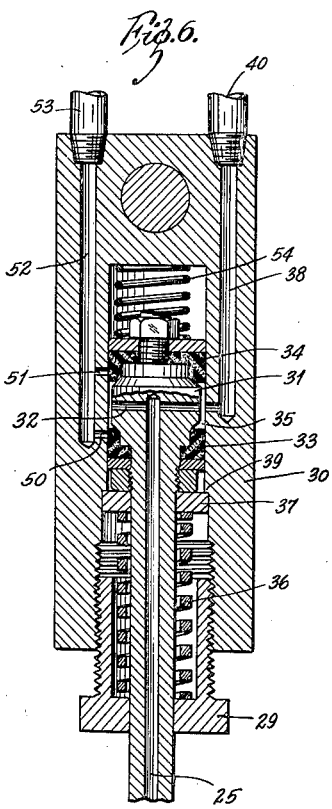
INVENTOR:
JOHN H. SCHREIBER,
BY John D. Rippey
HIS ATTORNEY.

Patented Sept. 6, 1949

2,481,161

UNITED STATES PATENT OFFICE 2,481,161

JOINT BREAKER AND CATHEAD

John H. Schreiber, St. Louis, Mo.

Application April 22, 1944, Serial No. 532,239

10 Claims. (Cl. 254—173)

This invention relates to joint breakers and catheads of the type used for breaking joints between pipe sections in oil fields and elsewhere, and to mechanism for effectively controlling the operation thereof.

Objects of the invention are to provide an improved joint breaker and cathead having a rotor mounted for constant rotation in one direction when the mechanism is in operation, and a drum for the jerk line mounted on said rotor for rotation thereby at the option of the operative, in combination with devices operated hydraulically for optionally clutching or attaching the drum to the rotor so that said rotor will rotate said drum and wind the jerk line thereon; to provide means cooperating with said hydraulic devices for resiliently rotating said drum in the opposite direction when said hydraulic devices are released, and thereby rotating and restoring said drum to its initial datum or starting position after each operation thereof by said rotor after release of said hydraulic devices, leaving the jerk line free to unwind from said drum during said opposite rotation of said drum to its said initial datum or starting position; and to provide manual means for controlling the application of said hydraulic power or pressure to said hydraulically operated devices and for releasing said hydraulic power or pressure after a sufficient length of the jerk line has been wound on said drum as aforesaid, leaving said resilient hydraulic means free to effect said opposite rotation and thereby restore or move the drum to its initial datum or starting position.

Another object of the invention is to provide improved hydraulic mechanism for operatively clutching or attaching a drum to a constantly rotating rotor whereby said drum will be rotated optionally by and with the rotor and will wind a jerk line thereon, and resilient means constituting a conduit in and as a part of the hydraulic mechanism for rotating and restoring or moving the drum to its initial datum or starting position after each rotary operation thereof by said rotor.

Another object of the invention is to provide an improved joint breaker and cathead having a rotor mounted for constant rotation in one direction when in operation, and a drum for the jerk line mounted on said rotor for rotation thereby at the option of the operative, in combination with devices operated hydraulically for optionally clutching or attaching the drum to the rotor so that said rotor will rotate said drum and wind the jerk line thereon, and adjustment means cooperatively associated with said devices for varying the distance of movement of the jerk line by said drum.

Various other objects and advantages of the invention will be apparent from the following description, reference being made to the annexed drawings, in which—

Fig. 1 is an end elevation of a joint breaker or cathead showing resilient conduit means forming a part of the hydraulic mechanism cooperatively associated with the drum and functioning also to restore or move the drum to its initial datum or starting position after each operative rotation thereof by the rotor.

Fig. 2 is a side elevation of the invention.

Fig. 3 is a cross-sectional view on the line 3—3 of Fig. 2, which line is also indicated on Fig. 4.

Fig. 4 is a longitudinal sectional view of the joint breaker or cathead on the line 4—4 of Fig. 1, which line is also indicated on Fig. 3.

Fig. 5 is a sectional view of the manually operative control unit forming a part of the hydraulic mechanism.

Fig. 6 is an enlarged sectional view of the automatic control device included in the hydraulic mechanism.

The rotor which is adapted for constant rotation in one direction when the mechanism is in operation, but which may possibly and inadvertently be rotated in the opposite direction, comprises a hub 1 adapted for attachment to the draw-works shaft (not shown) for rotation thereby. The hub 1 is attached to a member comprising an inwardly extended flange 2 and a cylindrical portion 3 which is concentric with the hub 1. Detachable fasteners 4 secure the flange 2 to one end of the hub 1 and are releasable to permit disassembly and reassembly of the device for repairs, replacements of parts, or other purposes. A radial flange 5 is integral with the opposite end of the hub 1 from the end to which the flange 2 is attached. Two bushing rings 6 and 7 are mounted on the hub 1 between the flanges 2 and 5.

A drum for operating the jerk line is mounted on the rotor for rotation thereby at the option of the operator. In the modification of the invention shown, said drum comprises a cylindrical portion 8 rotatively journalled on the bushings 6 and 7 and engaging end flanges 9 on said bushings and thereby holding said bushing in proper assembly in which the bushing flanges 9 seat against the rotor flanges 5 and 2, respectively. The drum further comprises a circumferential flange 10 supporting a cylindrical portion 11 concentric with the cylindrical portion 8 and providing an annular space 12 between said cylindrical portions for enclosing a portion of the resilient hydraulic conduit. The drum also comprises a radial flange 13 separated from the flange 10 by a space 14 circumferentially around the cylindrical portion 8 for receiving the windings of the jerk line. The flange 13 of the drum is separated from the adjacent flange 2 of the rotor by an annular space 15 which is enclosed by the cylindrical portion 3 of the rotor which also encloses the flange 13. That is, the flange 13 of the drum is within and enclosed by the cylindrical portion 3 of the rotor.

Two complementary clutching or attaching elements or shoes are pivotally connected with each other and with the drum by a pivot pin 16 attached to the flange 13 and projecting into the space 15 toward the rotor flange 2 and parallel with the axis of the hub 1. Each clutch or attaching element or shoe is of arcuate form including a radial portion 17 and an arcuate flange 18 projecting laterally from opposite sides of the radial portion 17. Thus, each clutch or attaching element or shoe 17—18 is substantially T-shaped in cross-section or end elevation, as may be understood by reference to Fig. 4. The radius of curvature of the flanges 18 substantially conforms to the curvature of the inner periphery of the cylindrical portion 3 of the rotor. Thus, when the clutch or attaching elements or shoes are swung apart and into engagement with the inner periphery of the cylindrical portion 3 of the rotor, the drum is operatively clutched or attached to the rotor for rotation thereby. And, when the arcuate flanges 18 of the clutching or attaching elements or shoes 17—18 are out of engagement with the inner periphery of the cylindical portion 3 of the rotor, said rotor may continue to rotate without affecting or moving the drum, leaving said drum stationary. The free ends of the two clutching or attaching elements or shoes 17—18 are connected by a spring 19 functioning to actuate said clutching or attaching elements or shoes toward each other and out of engagement with the cylindical portion 3.

A cylinder 20 is integral with the flange 13 of the drum adjacent to the free ends of the members 17—18, and has its axis perpendicular to a plane extending diametrically through the hub 1 and pivot 16. Two pistons 21 are mounted for sliding movements in the cylinder 20 and are engaged by the ends 22 of the respective clutching or attaching elements or shoes 17—18. When hydraulic pressure is admitted into the cylinder 20 between the pistons 21 under sufficient pressure to overcome the power of the spring 9 and force said pistons outwardly in opposite directions, the clutching or attaching elements or shoes 17—18 will be moved by said pistons into clutching or attaching engagement or contact with the inner periphery of the cylindrical portion 3 of the rotor. And, when said hydraulic pressure is removed or abated to the permissible extent, the spring 19 will swing the free ends of the clutching or attaching elements or shoes 17—18 inwardly toward each other, thereby moving the pistons 21 toward each other, and also moving the arcuate flanges 18 out of clutching or attaching engagement with the inner periphery of said cylindrical portion 3.

A resilient capillary tube comprising an end section 23, an intermediate spring coil section 24, and an extension 25 is provided. The end section 23 connects into the cylinder 20 at a point intermediate the inner ends of the pistons 21. The coil section 24 seats within the annular space 12 and the extension 25 is connected into a hydraulic device hereinafter described. A jerk line 26 has one end pivotally attached to a support 27 projecting preferably from the flange 10 into the space 14 parallel with the axis of the drum and of the rotor. The cylindrical portion 8 of the drum is preferably formed with a spiral groove 28 beginning about at the support 27 and winding around and extending spirally to the flange 13 of the drum for receiving the windings of said jerk line.

The stretch 25 of the resilient capillary tube 23—24—25 extends for free sliding movements through a gland 29 which is screwed into a cylinder member 30. The end of the stretch 25 within the cylinder 30 has a head 31 formed with a diametrical passage 32 intersecting and opening into the passage through said spring tube 23—24—25. A sealing packing ring element 33 is attached to one end of the head 31 and an analogous sealing packing ring element 34 is attached to the opposite end of said head 31. The sealing packing ring elements 33 and 34 are in close sealing contact with the inner periphery of the cylinder 30 to prevent escape of the liquid from an intervening annular space 35 around the head 31 into which the passage 32 opens. A spring 36 is mounted between the gland 29 and a washer 37 through which the stretch 25 extends. When the mechanism is in its initial datum or unoperated position, that is, when the jerk line 26 is wholly unwound from the drum, and regardless of whether the rotor is stationary or is in rotation, the spring 36 holds the head 31 and its attached parts in about the positions shown in Fig. 6 in which the diametrical passage 32 is in communication with an inlet passage 38 opening into the cylinder 30 between the packing sealing rings 33 and 34. In this position, the said washer 37 seats against an annular shoulder 39 on the inner periphery of the cylinder 30 and thereby prevents further movement of the piston head 31 and its attached parts by said spring 36. A tube 40 has one end opening into the passage 38 and the opposite end opening into a passage 41 which opens into a valve cylinder or housing 42 (Fig. 5). The valve cylinder or housing 42 is attached to and is within a liquid container 43, and has a port 44 opening into said container. A piston valve 45 is mounted for sliding movements in the inner end of the valve cylinder or housing for movement to open and close the port 44 and to apply pressure against the column of liquid in the tube 40 and extending therefrom through the diametrical passage 35, through the capillary resilient tube 23—24—25, and into the cylinder 20, filling the space between the pistons 21. A rod 46 pivotally connects the piston valve 45 with a lever arm 47 attached to a support 48 pivotally supported by the container 43 for manual operation by a lever 49. A spring 55 in the valve housing or cylinder 42 actuates the piston valve 45 away from the effluent passage 41 to a position in which the port 44 is open and the lever arm 47 abuts against a wall of the container 43. This leaves the column of liquid from the container 43 to the cylinder 20 free from pressure, and leaves the spring 19 free to hold the clutching or attaching elements or shoes 17—18 out of engagement with the cylindrical portion 3 of the rotor. In this adjustment, the rotor may continue to rotate freely without rotating the jerk line drum. When the lever 49 is manually operated and the piston valve 45 is moved across the port 44, it applies pressure to and against the column of liquid from the piston valve cylinder or housing 42 to the cylinder 20, forces the pistons 21 in opposite directions, and thereby forces the clutching or attaching elements or shoes 17—18 into engagement with the inner periphery of the cylindrical portion 3 of the rotor. When this occurs, the jerk line drum will be rotated, the jerk line 26 wound thereon, and the coiled spring portion 24 placed and held under tension until the pressure against the hydraulic column is released.

As shown, the spring 36, in cooperation with the spring coils 54, normally hold the head 31 in a position in which the sealing packing rings 33 and 34, respectively, close outlet or effluent ports 50 and 51 from the cylinder 30. That is, until a desired length of the jerk line 26 is wound on the drum, the said effluent ports 50 and 51 from the cylinder 30 are closed by the respective packing sealing devices 33 and 34. The parts are so arranged and proportioned that, when the jerk line drum has been rotated or turned the required distance, even to the extent of one complete revolution more or less as desired, the head 31 will be moved by the capillary tube device 23—24—25 against the resistance of the spring 36 to cause the packing sealing device 33 to open the effluent port 50, thereby bypassing and releasing or abating the pressure of the column of liquid between and against the pistons 21. The effluent ports 50 and 51 open into a passage 52 having tube connection 53 with the inside of the container 43. When the pressure between the pistons 21 is discontinued, released or abated, as described, the spring 19 acts immediately to disengage the clutching or attaching elements or shoes 17—18 from the cylindrical portion 3 of the rotor, leaving the rotor free to continue in operation while the coiled portion 24 of the resilient tube acts to turn the drum to its initial datum or starting position preparatory for another operation.

A spring 54 is mounted in the cylinder 30 at the opposite end of the head 31 from the spring 36, and is of less strength or tension than said spring 36. Should the drum be engaged with and rotated in the wrong direction by the rotor also rotating in the wrong direction, the coiled portion 24 of the tubular conduit will overcome the power of the spring 54 and cause the packing sealing device 34 to open the effluent part 51, thus discontinuing, releasing, or abating the pressure against the column of liquid extending into the cylinder 21. When the pressure against said column of liquid is thus discontinued, released or abated, the coiled portion 24 of the resilient tubular conduit immediately rotates the drum to its initial datum or starting position and unwinds the jerk line 26 therefrom.

It is evident that my invention, including the constantly operating rotor, the devices for hydraulically clutching or attaching the drum to the rotor for operation thereby, and the means for restoring or moving the drum to its initial datum or starting position, attains all of its intended objects and purposes accurately and conveniently without any percussive action against any of the parts. By the elimination and avoidance of percussive action in the mechanism between the jerk line and the rotor, durability of the joint breaker and cathead is largely prolonged, and liability of damage to or breakage of any of the parts is avoided. While one embodiment has been specifically illustrated and described, it will be understood that the form and arrangement of the parts may be varied within the limits of the invention as defined by the appended claims.

I claim:

1. A joint breaker and cathead comprising a rotor, a drum supported adjacent to said rotor for optional operation thereby from an initial starting or datum position to operate a jerk line, hydraulically operative clutching and attaching elements mounted between said drum and said rotor for movement to and from position to rotate said drum by said rotor, means for confining a column of liquid for hydraulically operating said elements to position to rotate said drum by said rotor, means for optionally applying pressure to said column of liquid and thereby operating said elements as aforesaid to said position, means for terminating said pressure of said column of liquid after said drum has been rotated a predetermined distance by said rotor, and a resilient portion included in said first means for rotating said drum to said initial datum or starting position when said pressure against said column of liquid is discontinued.

2. A joint breaker and cathead comprising a rotor, a drum supported by said rotor for optional rotation thereby from an initial starting or datum position, means for connecting a jerk line to said drum, clutching and attaching elements supported by said drum for movement into engagement with said rotor to rotate said drum thereby, a spring connecting and holding said elements out of engagement with said rotor and yielding to permit movement of said elements into engagement with said rotor, resilient means for confining a column of liquid for hydraulically operating said elements and for rotating said drum to said initial datum or starting position when pressure against said column of liquid is discontinued, and means for optionally applying pressure to said column of liquid and thereby operating said elements as aforesaid.

3. A driver for attachment to a shaft normally in continuous motion, a normally stationary member supported adjacent said driver for optional intermittent clutching engagement therewith, means attached to said driver preventing displacement of said member, hydraulically operated clutch mechanism supported by said normally stationary member, a resilient member for conducting liquid to the clutch member and returning the normally stationary member to its starting position after the hydraulic pressure is released and a predetermined tension has been set up in the resilient member by movement of the normally stationary member with the driver.

4. In a device of the class described, a drive member for attachment to a shaft normally having a continuous rotary movement, a drum in operative relation to said drive member having a normal position of rest, a fluid pressure actuated clutch carried by and rotatable with said drum, in combination with means for actuating said clutch, including a fluid pressure conduit having an extensible section to tension the same when said drum is rotated, means for imposing a fluid pressure in said conduit to move said clutch to engaging position, and means for releasing pressure in said conduit actuated in response to tension of said conduit when it is extended by predetermined extent of rotation of said drum.

5. In a device of the class described, a rotary drive member, a drum in operative relation with said drive member and normally disconnected therefrom, a clutch carried by said drum for engaging and disengaging the same from said drive member, in combination with means for moving said clutch to engaging position, comprising an actuator, a flexible pressure conduit connected into said actuator, manual means for impressing pressure in said conduit to actuate said clutch actuator to engage the clutch, and a device operated in response to the extent of predetermined rotation of said drum to release pressure in said conduit and to return said drum to initial position after the drum has been rotated a predetermined distance.

6. In a device of the class described, a drive member adapted to be mounted upon a constantly rotating shaft, a drum operatively related to said drive member, a clutch between said drive member and said drum, means normally holding said clutch in disengaged position, in combination with an actuator for moving said clutch to engaging position, a pressure conduit connected with said actuator having an expansible and contractible coil section to vary the tension of said conduit cooperatively connected with said drum whereby the tension of said conduit is increased when said drum is moved from its initial position, manual means for impressing pressure in said conduit to actuate said actuator to engage said clutch, and means operable through the tension of said coil section to release pressure in said conduit to disengage said clutch after said drum has rotated a predetermined distance.

7. In a device of the class described, a drive member adapted to be mounted upon a constantly rotating shaft, a drum operatively related to said drive member, a clutch between said drive member and said drum, means normally holding said clutch in disengaged position, in combination with an actuator for moving said clutch to engaging position, a pressure conduit connected with said actuator having an expansible and contractible coil section cooperatively connected with said drum to increase the tension thereof when said drum is moved from its initial position, manual means for impressing pressure in said conduit to actuate said actuator to engage said clutch, and means operable through the tension of said coil section to release pressure in said conduit and to return said drum to initial position after said drum has rotated a predetermined distance.

8. In a device of the class described, a drive member, a driven member normally disconnected from said drive member, a clutch device between said drive and driven members normally disengaged, in combination with means for operating said clutch including a clutch actuator, a fluid pressure conduit carried by and operatively associated with said driven member whereby on movement thereof the tension of said conduit will be increased, manual means for impressing pressure in said conduit, and automatic means for releasing pressure to disengage said clutch when said conduit has been tensioned to a predetermined extent by movement of said driven member.

9. In a device of the class described, a drive member, a driven member normally disconnected from said drive member, a clutch device between said drive and driven member normally disengaged, in combination with means for operating said clutch including a clutch actuator, a fluid pressure conduit carried by and operatively associated with said driven member whereby on movement thereof the tension of said conduit will be increased, manual means for impressing pressure in said conduit, and automatic means for releasing pressure when said conduit has been tensioned to a predetermined extent by movement of said driven member to disengage said clutch to retard further movement of said driven member and to return it to initial position.

10. In a device of the class described, a drive member normally having a continuous rotary movement, a drum in operative relation to said drive member, a clutch carried by said drum for engaging and disengaging said drum with and from said drive member, in combination with an actuator for said clutch including a flexible conduit directly connected into said actuator, manual means for impressing fluid pressure in said conduit to engage said clutch, and automatic means to release pressure in said conduit to disengage said clutch and to reverse the rotation of said drum after a predetermined movement of said drum from its initial position.

JOHN H. SCHREIBER.

REFERENCES CITED

The following references are of record in the file of this patent:

UNITED STATES PATENTS

| Number | Name | Date |
|---|---|---|
| 847,572 | Hanson | Mar. 19, 1907 |
| 906,841 | Whitcomb | Dec. 15, 1908 |
| 1,020,066 | Westbrook | Mar. 12, 1912 |
| 1,740,694 | Holmes | Dec. 24, 1929 |
| 1,765,492 | Lucas | June 24, 1930 |
| 1,853,547 | Byrd | Apr. 12, 1932 |
| 2,159,137 | Doty | May 23, 1939 |
| 2,163,028 | Foster | June 20, 1939 |
| 2,189,373 | Steel | Feb. 6, 1940 |
| 2,197,063 | Ashton | Apr. 16, 1940 |
| 2,247,518 | Owen | July 1, 1941 |
| 2,262,694 | Minyard | Nov. 11, 1941 |
| 2,295,932 | Campbell et al. | Sept. 15, 1942 |